(12) United States Patent
Urakawa et al.

(10) Patent No.: US 7,642,475 B2
(45) Date of Patent: Jan. 5, 2010

(54) LEVER OPERATING DEVICE

(75) Inventors: Masatsugu Urakawa, Miyagi-ken (JP); Noriyuki Kowase, Miyagi-ken (JP); Hidefumi Koizumi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/274,538

(22) Filed: Nov. 20, 2008

(65) Prior Publication Data

US 2009/0139850 A1    Jun. 4, 2009

(30) Foreign Application Priority Data

Nov. 29, 2007    (JP) .............................. 2007-309154

(51) Int. Cl.
*H01H 3/04*    (2006.01)
(52) U.S. Cl. ..................... 200/61.54; 200/332; 200/335
(58) Field of Classification Search .............. 200/17 R, 200/61.27, 61.3, 61.54, 332, 335; 335/205–207
See application file for complete search history.

(56) References Cited

U.S. PATENT DOCUMENTS

| | | | |
|---|---|---|---|
| 5,457,443 A | | 10/1995 | Yamauchi et al. |
| 5,780,794 A | * | 7/1998 | Uchiyama et al. ........ 200/61.54 |
| 6,300,852 B1 | * | 10/2001 | Kato .......................... 335/170 |
| 6,399,905 B1 | * | 6/2002 | Nishikawa et al. ....... 200/61.54 |
| 6,441,327 B1 | * | 8/2002 | Shibata et al. ........... 200/61.27 |
| 6,518,524 B1 | * | 2/2003 | Brandt et al. ............ 200/61.54 |
| 6,953,902 B2 | * | 10/2005 | Naito ........................ 200/61.3 |
| 7,019,226 B2 | * | 3/2006 | Otani et al. ............... 200/16 D |
| 7,402,768 B2 | * | 7/2008 | Sugino et al. ............ 200/61.54 |
| 7,485,819 B2 | * | 2/2009 | Reischl et al. ........... 200/61.54 |

FOREIGN PATENT DOCUMENTS

| | | |
|---|---|---|
| DE | 299 01 614 U1 | 4/1999 |
| EP | 0 991 190 A1 | 4/2000 |
| JP | 2001-006494 | 1/2001 |
| WO | 97/39916 | 10/1997 |
| WO | 2006/035342 A1 | 4/2006 |

OTHER PUBLICATIONS

Search Report issued in corresponding European Patent Application 08 01 9773; mailed Mar. 4, 2009.

* cited by examiner

*Primary Examiner*—Michael A Friedhofer
(74) *Attorney, Agent, or Firm*—Brinks Hofer Gilson & Lione

(57) ABSTRACT

Disclosed is a lever operating device having a simple structure and high durability without a contact defect.

In the disclosed lever operating device, when an operating lever is tilted in one of the first and second operating surfaces that are substantially orthogonal to each other, a slider supported by a lever support is selectively moved in one of two directions that are substantially orthogonal to each other in a plane parallel to a circuit board, and the electric resistance of a GMR sensor mounted to the circuit board varies depending on the position of a permanent magnet held by the slider. In this way, the operating position of the operating lever is detected.

1 Claim, 9 Drawing Sheets

LEVER OPERATING DEVICE

CLAIM OF PRIORITY

This application claims benefit of the Japanese Patent Application No. 2007-309154 filed on Nov. 29, 2007, the entire content of which is hereby incorporated by reference.

BACKGROUND

1. Technical Field

The present invention relates to a lever operating device used for a vehicle.

2. Related Art

In general, a pair of stalk switch devices, which are examples of lever operating devices, are provided on the left and right sides of a case fixed to a steering column to form a combination switch. A user can tilt each of the stalk switch devices in a desired direction to perform, for example, an operation of switching the beam position of a headlamp, a turn signal switching operation, and a wiper switching operation. For example, in the case of a stalk switch device in which an operating lever is tilted substantially in the vertical direction to perform a turn signal operation, the operating lever is tilted substantially in the front-rear direction to perform an operation of switching the beam position of a head lamp (switching between a low beam and a high beam) or a passing operation.

The general structure of the stalk switch device will be described below. A base portion of the operating lever is rotatably connected to a lever support (holder), and the operating lever can be tilted with respect to the lever support in a predetermined operating surface (first operating surface) In addition, the lever support is rotatably connected to a housing (first and second cases), which is a stator member, and the operating lever and the lever support can be integrally tilted in another operating surface (second operating surface) that is substantially orthogonal to the first operating surface. That is, the rotating axis of the operating lever with respect to the lever support is substantially orthogonal to that of the operating lever and the lever support with respect to the housing, and the operating lever can be tilted in two directions that are substantially orthogonal to each other. A circuit board is fixed to the housing so as to extend substantially in parallel to the second operating surface, and two sets of contact patterns are formed on the circuit board. In addition, a pair of moving bodies (sliding-element supporting members) are slidably provided on the circuit board, and sliding elements are attached to the moving bodies. When the operating lever is tilted in the first or second operating surface, one of the moving bodies is driven and slides on the circuit board. In this way, a contact point switching operation is performed by variation in the position of the moving body relative to the circuit board (for example, see JP-A-2001-6494).

However, in the above-mentioned lever operating device according to the related art, the sliding elements attached to the moving bodies slide on the contact pattern of the circuit board, thereby switching the contact points. Therefore, when the operating lever is frequently tilted, the contact pattern may be worn away over time, or conduction defects may occur due to the oxidation or sulfurization of the contact pattern. In addition, two sets of contact switching mechanism each having a sliding element and a contact pattern are provided. One contact switching mechanism is operated by the tilting of the operating lever in the first operating surface, and the other contact switching mechanism is operated by the tilting of the operating lever in the second operating surface. Therefore, the number of components of the contact switching mechanisms is increased, and a large space is needed to arrange the components.

SUMMARY

According to an aspect of the invention, a lever operating device includes: an operating lever; a lever support that supports the operating lever such that the operating lever can be tilted in a first operating surface; a housing that supports the operating lever through the lever support such that the operating lever can be rotated in a second operating surface substantially orthogonal to the first operating surface; a circuit board that is attached to the housing and extends substantially in parallel to the second operating surface; a giant magneto-resistive effect sensor that is mounted to the circuit board; a slider that is movably supported by the lever support; and a permanent magnet that is held by the slider and is magnetized in a direction that is substantially orthogonal to the circuit board. When the operating lever is tilted in the first operating surface, the slider is moved in one direction in a plane that is parallel to the circuit board. When the operating lever is tilted in the second operating surface, the lever support and the slider are moved in the other direction in the plane that is parallel to the circuit board. The giant magneto-resistive effect sensor detects a variation in the magnetic field of the permanent magnet due to the movement of the slider.

In the lever operating device having the above-mentioned structure, when the operating lever is tilted in the first operating surface, the slider supported by the lever support is moved in one direction in the plane parallel to the circuit board. Therefore, an external magnetic field varies depending on the position of the permanent magnet held by the slider, and the electric resistance of the giant magneto-resistive effect sensor mounted to the circuit board varies due to the variation in the magnetic field. When the operating lever is tilted in the second operating surface that is substantially orthogonal to the first operating surface, the lever support and the slider are moved in the other direction in the plane that is parallel to the circuit board. In this case, the external magnetic field varies depending on the position of the permanent magnet held by the slider, and the electric resistance of the giant magneto-resistive effect sensor mounted to the circuit board varies due to the variation in the magnetic field. Therefore, it is possible to perform the switching of the operating lever by detecting the operating position of the operating lever on the basis of the variation in the resistance of the giant magneto-resistive effect sensor. As a result, it is possible to provide a stalk switch device having high durability without a contact defect, such as the abrasion or oxidation of contact points. In addition, it is possible to detect the tilting operation of the operating lever in the first operating surface and the tilting operation of the operating lever in the second operating surface using a set of the permanent magnet and the giant magneto-resistive effect sensor. As a result, it is possible to simplify a detection mechanism and reduce the size of a stalk switch device.

DESCRIPTION OF EXEMPLARY
EMBODIMENTS

Figure 1:
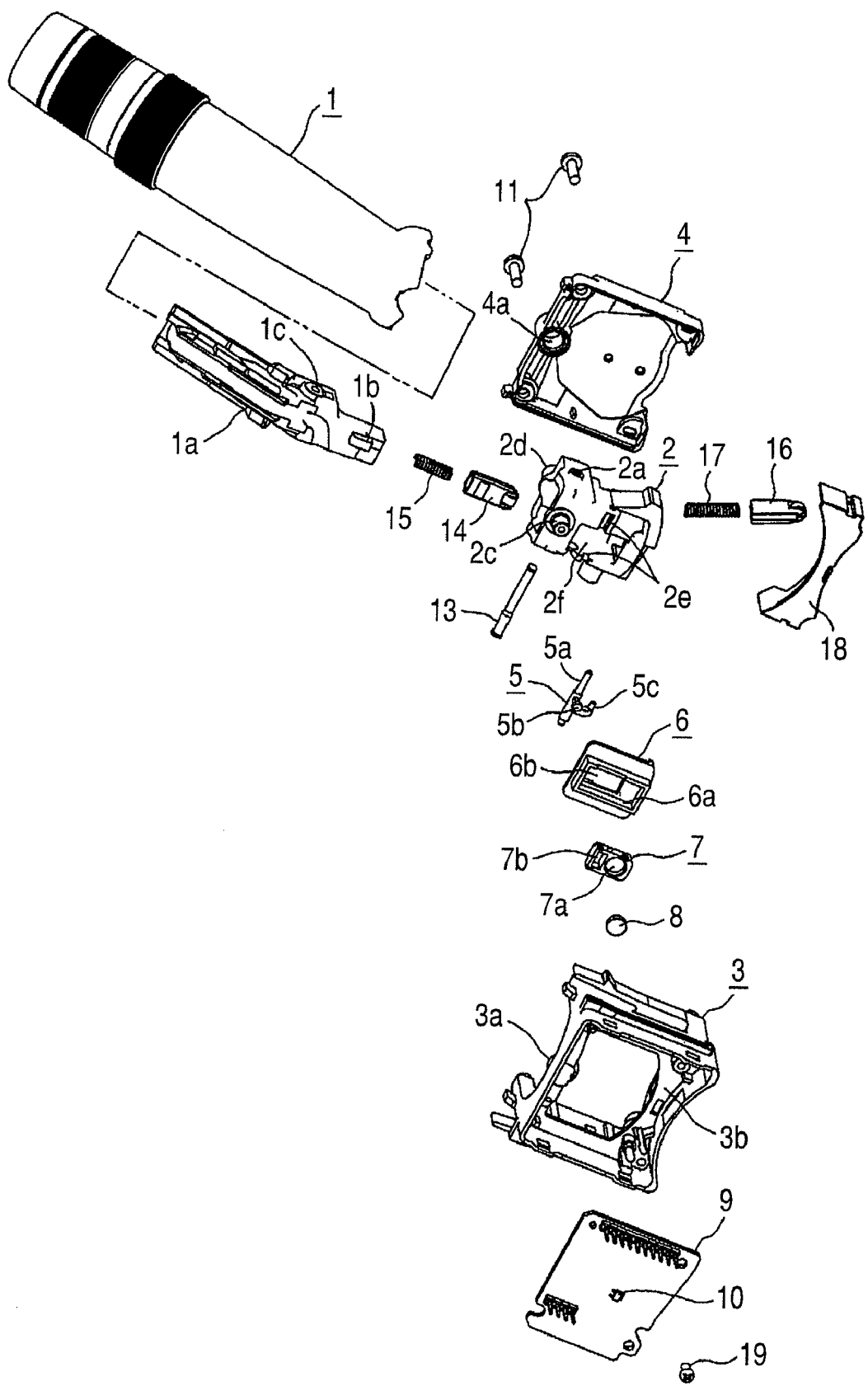
FIG. 1 is an exploded perspective view illustrating a stalk switch device according to an embodiment of the invention.
Figure 2:
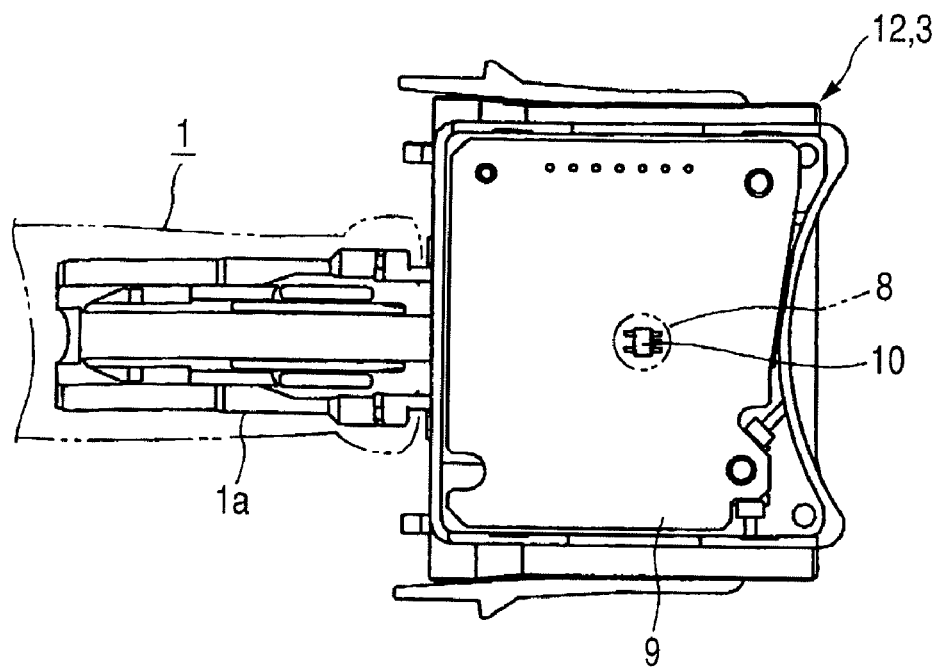
FIG. 2 is a bottom view illustrating the stalk switch device according to the embodiment of the invention.
Figure 3:
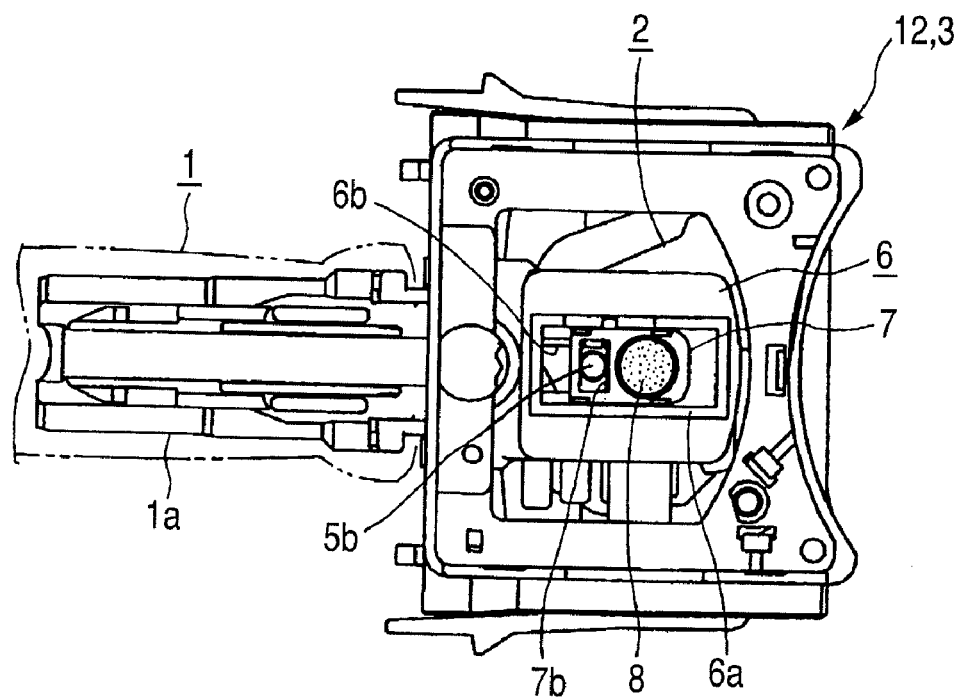
FIG. 3 is a bottom view illustrating the stalk switch device shown in FIG. 2 from which a circuit board is removed.
Figure 4:
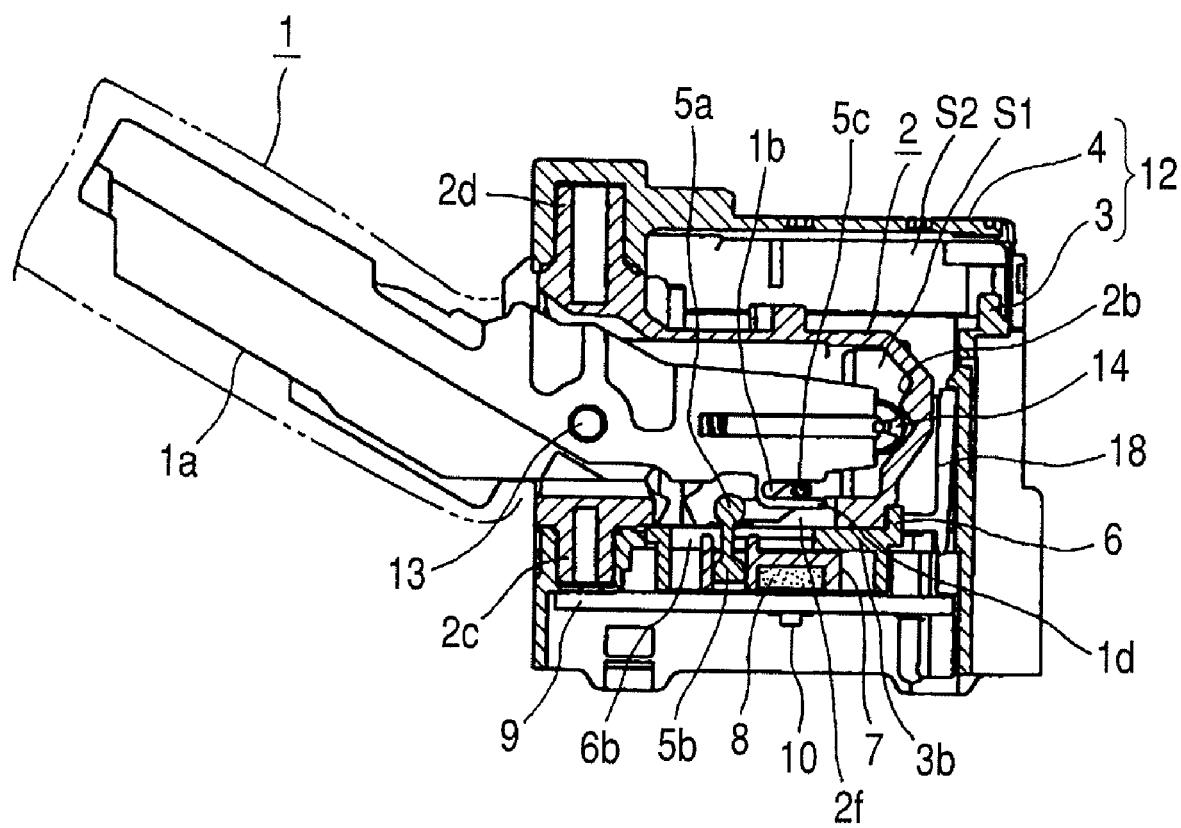
FIG. 4 is a cross-sectional view illustrating the stalk switch device according to the embodiment of the invention.
Figure 5A:
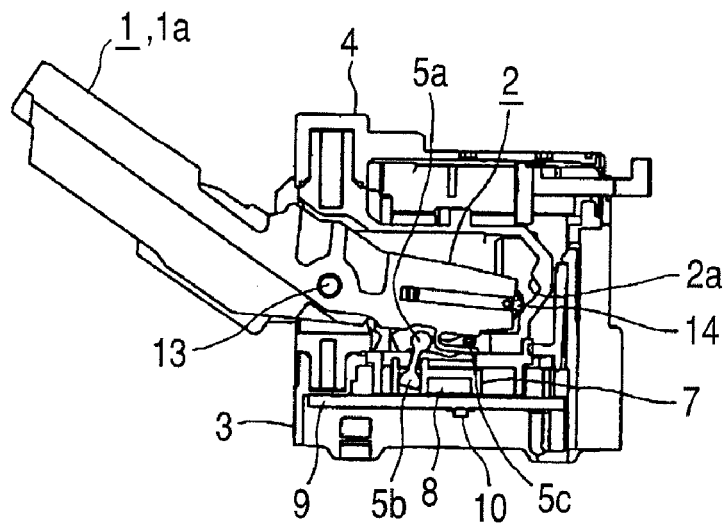
FIGS. 5A to 5C are cross-sectional views illustrating the movement of a driving arm and slider when an operating lever shown in FIG. 4 is tilted in a first operating surface.
Figure 5B:
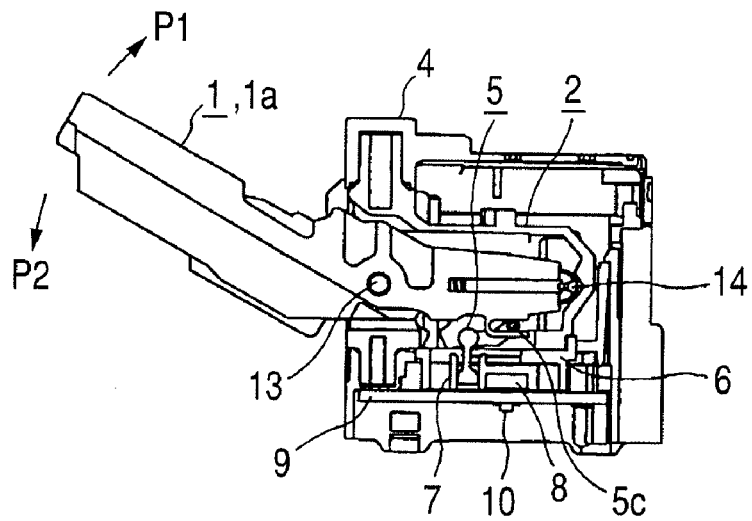
Figure 5C:
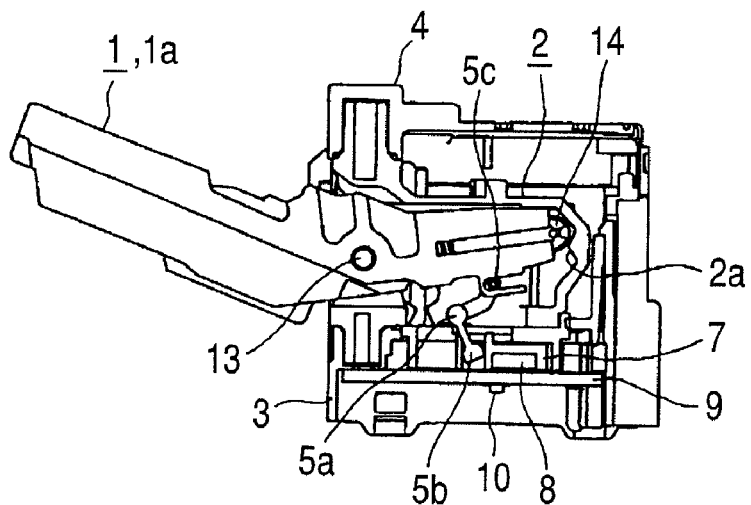
Figure 6A:
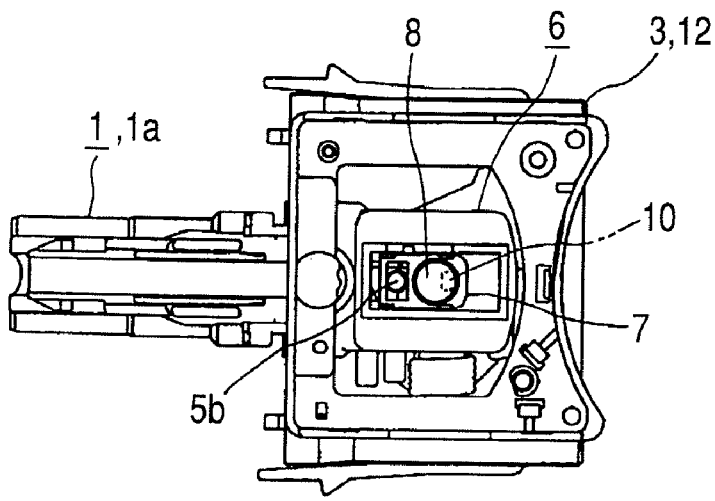
FIGS. 6A to 6C are bottom views corresponding to FIGS. 5A to 5C, respectively.
Figure 6B:
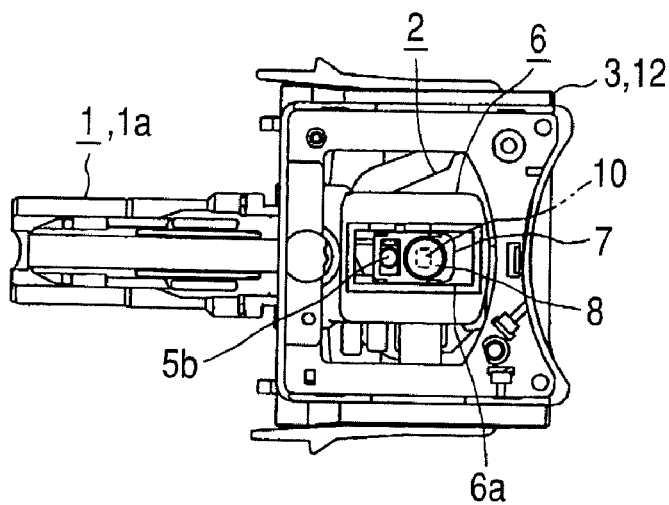
Figure 6C:
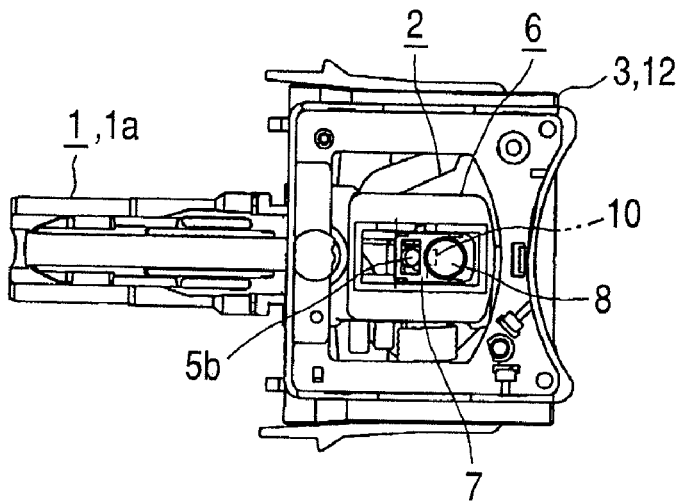
Figure 7A:
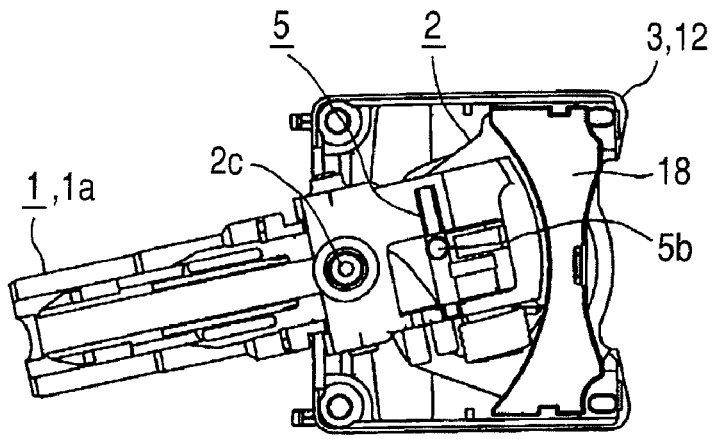
FIGS. 7A to 7C are bottom views illustrating the movement of the driving arm when the operating lever shown in FIG. 3 is tilted in a second operating surface.
Figure 7B:
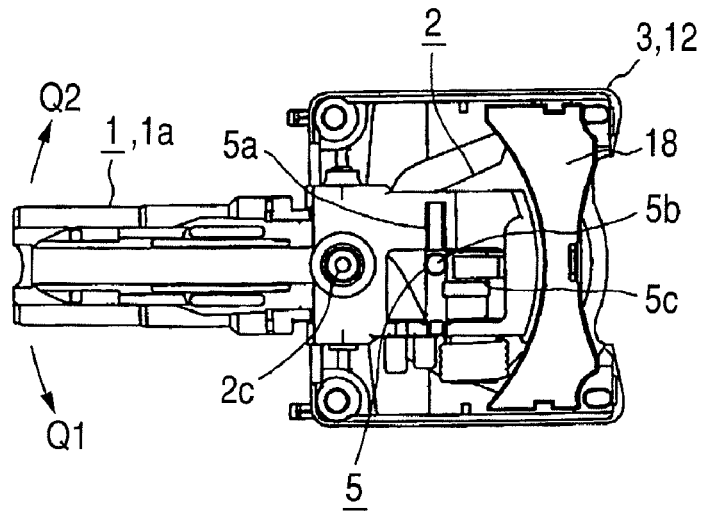
Figure 7C:
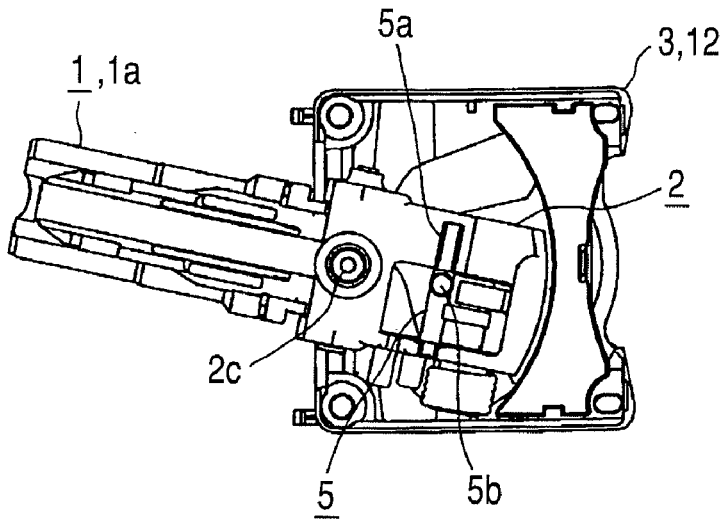
Figure 8A:
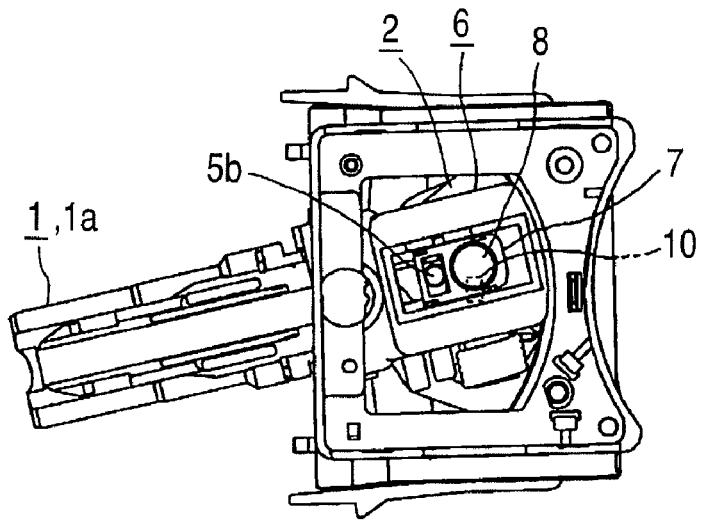
FIGS. 8A to 8C are bottom views illustrating the movement of the slider when the operating lever shown in FIG. 3 is tilted in the second operating surface.
Figure 8B:
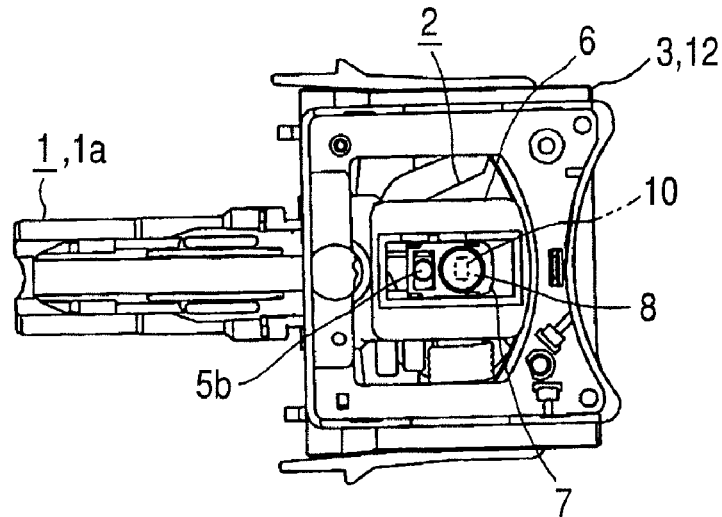
Figure 8C:
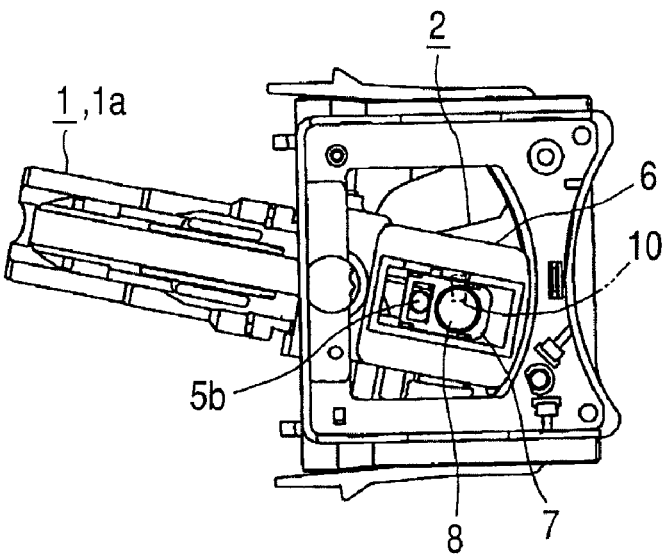
Figure 9:
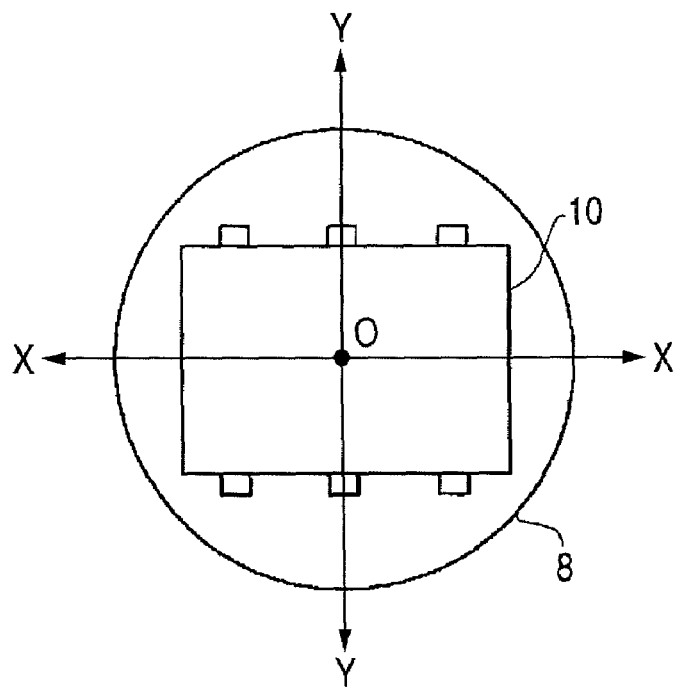
FIG. 9 is a diagram illustrating the positional relationship between a permanent magnet and a giant magneto-resistive effect sensor according to the embodiment of the invention.
Figure 10:
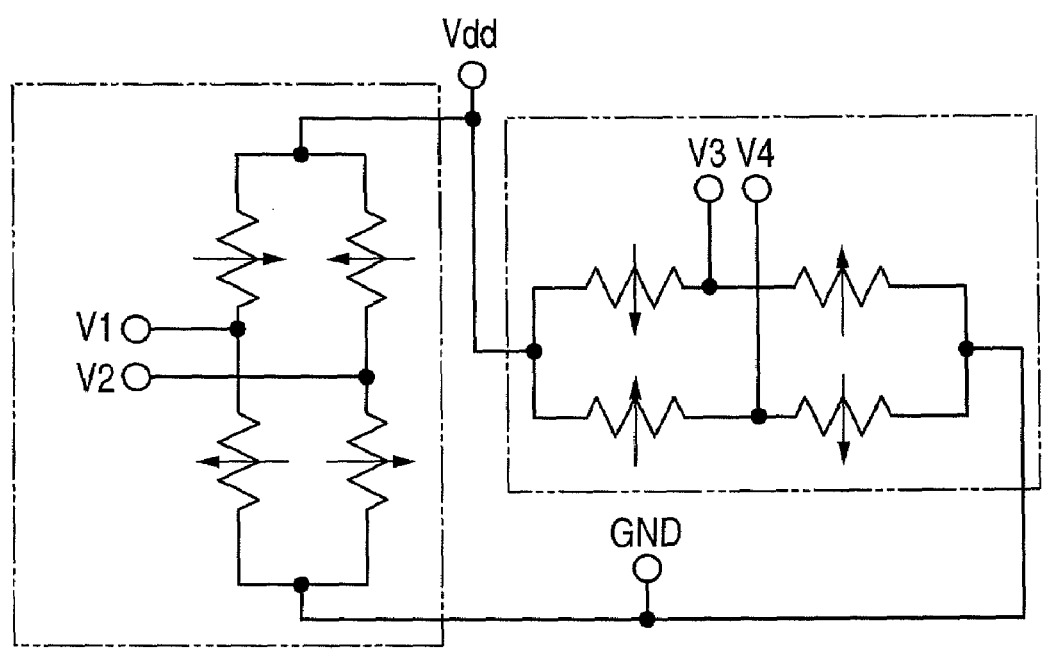
FIG. 10 is a circuit diagram illustrating the structure of the giant magneto-resistive effect sensor according to the embodiment of the invention.
Figure 11A:
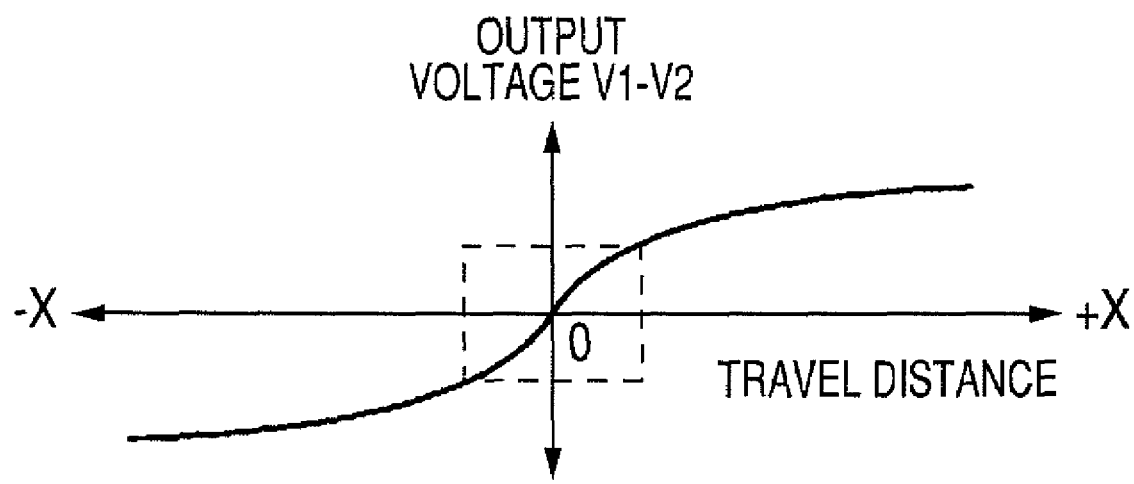
FIGS. 11A and 11B are diagrams illustrating the relationship between the travel distance of the permanent magnet and the output voltage of the giant magneto-resistive effect sensor.
Figure 11B:
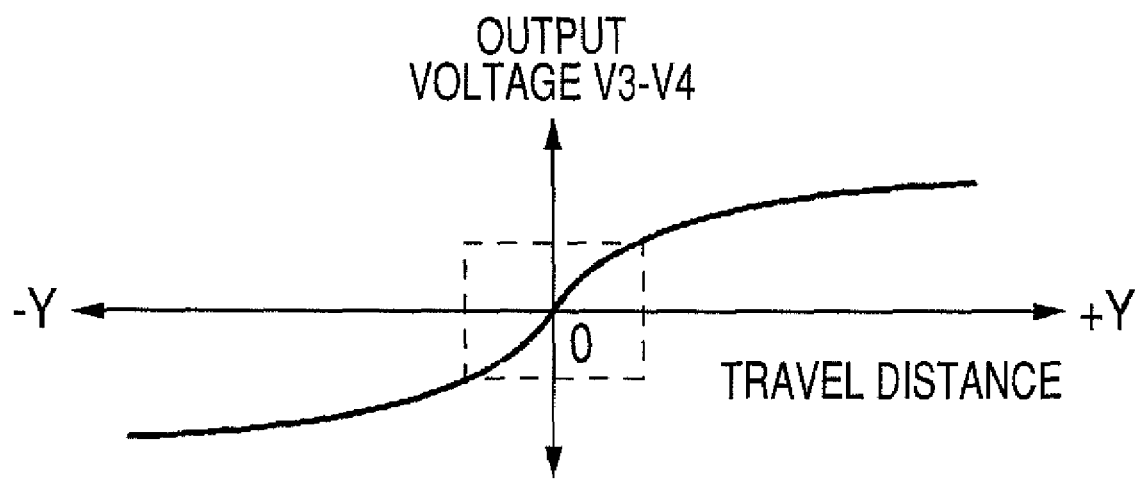

Hereinafter, exemplary embodiments of the invention will be described with reference to the accompanying drawings. FIG. 1 is an exploded perspective view illustrating a stalk switch device, which is an example of a lever operating device according to an embodiment of the invention. FIG. 2 is a bottom view illustrating the stalk switch device according to the embodiment of the invention. FIG. 3 is a bottom view illustrating the stalk switch device shown in FIG. 2 from which a circuit board is removed. FIG. 4 is a cross-sectional view illustrating the stalk switch device according to the embodiment of the invention. FIGS. 5A to 5C are cross-sectional views illustrating the movement of a driving arm and a slider when an operating lever shown in FIG. 4 is tilted in a first operating surface. FIGS. 6A to 6C are bottom views corresponding to FIGS. 5A to 5C, respectively. FIGS. 7A to 7C are bottom views illustrating the movement of the driving arm when the operating lever shown in FIG. 3 is tilted in a second operating surface. FIGS. 8A to 8C are bottom views illustrating the movement of the slider when the operating lever shown in FIG. 3 is tilted in the second operating surface. FIG. 9 is a diagram illustrating the positional relationship between a permanent magnet and a giant magneto-resistive effect sensor according to the embodiment of the invention. FIG. 10 is a circuit diagram illustrating the structure of the giant magneto-resistive effect sensor according to the embodiment of the invention. FIGS. 11A and 11B are diagrams illustrating the relationship between the travel distance of the permanent magnet and the output voltage of the giant magneto-resistive effect sensor.

The stalk switch device shown in the drawings includes an operating lever 1 that has an operating member 1a operated by pressure, a lever support 2 which tiltably supports the operating lever 1 and in which the leading end of the operating member 1a, that is, a protruding portion of the operating lever 1 is accommodated in an accommodating portion S1 shown in FIG. 4, a case 3 and a cover 4 that rotatably support the lever support 2 therein, a driving arm 5 serving as a driving member that is rotatably supported by the lever support 2, a guide member 6 that is fixed to the lever support 2, a slider 7 that is slidably supported by the guide member 6, a permanent mag-net 8 that is held by the slider 7, a circuit board 9 that is fixed to the case 3, and a giant magneto-resistive effect (GMR) sensor 10 that is mounted to the circuit board 9. The case 3 and the cover 4 are integrated into a housing 12 by screws 11. The housing 12 forms an accommodating portion S2 for accommodating the leading end of the lever support 2, as shown in FIG. 4. The housing 12 is fixed to a steering column of a vehicle such that the operating lever 1 can be tilted in two directions that are substantially orthogonal to each other.

In the operating member 1a forming a base portion of the operating lever 1, an elongated portion other than the leading end protrudes from the lever support 2, and an engaging groove 1b is formed in an outer wall of the leading end of the operating member 1a facing the circuit board 9. As shown in FIG. 4, the engaging groove 1b is formed between a sealing portion 1d that protrudes from the lever support 2 to the circuit board 9 in an L shape in a cross-sectional view and the outer wall of the lever support 2. A bore 1c is provided in the operating member 1a, and a pin 13 passing through the bore 1c is rotatably supported by a bearing portion 2a of the lever support 2. The operating lever 1 is supported by the lever support 2 such that it can be tilted on the pin 13 in a first operating surface that is parallel to the plane of FIG. 4, that is, in a plane that is substantially orthogonal to the circuit board 9. In addition, a coil spring 15 that elastically urges a first pressing member 14 is provided in the operating member 1a. As shown in FIG. 4, the first pressing member 14 comes into elastic contact with a cam surface 2b that is formed on the inner wall of the lever support 2.

As shown in FIG. 1, a pair of rotating shafts 2c and 2d protrude from a base portion of the lever support 2 in the opposite direction on the same line, and a pair of shaft grooves 2e are formed in the outer wall of the lever support 2 facing the circuit board 9. The rotating shaft 2c protrudes toward a bottom plate 3b of the case 3 and is rotatably supported by a bearing portion 3a of the case 3. The rotating shaft 2d protrudes toward the cover 4 and is rotatably supported by a bearing portion 4a of the cover 4. Therefore, the lever support 2 is supported by the housing 12 such that it can be tilted on the rotating shafts 2c and 2d in the second operating surface that is substantially orthogonal to the first operating surface. When the operating lever 1 is tilted in the second operating surface, the lever support 2 is rotated integrally with the operating lever 1. In addition, a coil spring 17 that elastically urges a second pressing member 16 is provided in the lever support 2, and the second pressing member 16 comes into elastic contact with a cam surface (not shown) formed on the inner wall of a cam member 18 that is fixed to the case 3. The pair of shaft grooves 2e are formed in parallel to the rotating shaft of the operating lever 1, that is, the axis line of the pin 13 inserted into the bore 1c. As shown in FIG. 4, an opening 2f is formed in the outer wall of the lever support 2 facing the circuit board 9 so as to communicate with the accommodating portion S2. The sealing portion 1d is arranged so as to face the opening 2f with the leading end of the operating member 1a accommodated in the accommodating portion S2.

The driving arm 5 includes a shaft portion 5a that extends in a straight line, and an engaging portion 5b and an engaging pin 5c that protrude from the center of the shaft portion 5a in two different directions. Both ends of the shaft portion 5a are rotatably supported by the shaft grooves 2e of the lever support 2, and the engaging pin 5c is fitted into the engaging groove 1b that is formed in the operating member 1a of the operating lever 1. In this way, when the operating lever 1 is tilted with respect to the lever support 2 in the first operating surface, the driving arm 5 is rotated on the shaft grooves 2e of the lever support 2 in the first operating surface. When the operating lever 1 and the lever support 2 are tilted with respect to the housing 12 in the second operating surface, the lever support 2 and the driving arm 5 are integrally rotated on the rotating shafts 2c and 2d in the second operating surface. As such, when the driving arm 5 is used as a driving member, as shown in FIG. 4, it is possible to increase the rotation angle of the driving arm 5 to be larger than the rotation angle of the operating lever 1. This is because the movement of the engaging groove 1b is equal to that of the engaging pin 5c, although the radius of gyration of the engaging pin 5c provided in the driving arm 5 that rotates on the shaft portion 5a is considerably smaller than that of the engaging groove 1b provided in the operating lever 1 that rotates on the pin 13. Therefore, it is possible to increase the rotation angle of the engaging portion 5b of the driving arm 5. As a result, it is possible to increase the travel distance of the slider 7 and increase a variation in the output of the GMR sensor 10.

The guide member 6 is fixed to the lever support 2 by, for example, snapping connection. A rectangular guide wall 6a protrudes from the guide member 6, and a clearance 6b is provided in a portion surrounded by the guide wall 6a. A pair of opposite long sides of the guide wall 6a extend in a direction that is orthogonal to the shaft portion 5a of the driving arm 5, and the slider 7 is slidably supported between the pair of long sides of the guide wall 6a. A concave portion 7a and an engaging hole 7b are formed in the slider 7, and a permanent magnet 8 is fixed to the inside of the concave portion 7a by, for example, a compression or adhesion means. The permanent magnet 8 is magnetized in a direction that is substantially orthogonal to the circuit board 9. A portion of the permanent magnet facing the circuit board 9 may be the N pole or the S pole. The engaging portion 5b of the driving arm 5 passes through the clearance 6b to be fitted into the engaging hole 7b. When the engaging portion 5b is rotated in the first operating surface by the tilting of the operating lever 1, the slider 7 is reciprocated in a straight line along the long side of the guide wall 6a.

The circuit board 9 is fixed to the case 3 by a screw 19. The circuit board 9 is provided substantially in parallel to the second operating surface so as to face one surface (the lower surface in FIG. 4) of the bottom plate 3b of the case 3. The permanent magnet 8 faces one surface (the upper surface in FIG. 4) of the circuit board 9 with a minute gap therebetween. The GMR sensor 10 is mounted to the other surface (the lower surface in FIG. 4) of the circuit board 9, and is arranged in a moving region of the permanent magnet 8 or in the vicinity thereof. However, when a predetermined gap is formed between the permanent magnet 8 and the GMR sensor 10, the GMR sensor 10 may be mounted to the upper surface of the circuit board 9. The GMR sensor 10 is configured such that four GMR elements each having a laminated structure of a finned magnetic layer, a non-magnetic intermediate layer, and a free magnetic layer are connected to form a bridge circuit shown in FIG. 10, thereby forming one package shown in FIG. 9. Arrows shown in FIG. 10 indicate the magnetization directions of the finned magnetic layers of the GMR elements. As shown in FIG. 9, when the permanent magnet 8 is reciprocated with respect to the GMR sensor 10 in the X-axis direction and the Y-axis direction orthogonal to each other, an external magnetic field varies depending on the position of the permanent magnet 8, and the magnetization direction of the free magnetic layer of each of the GMR elements varies, which results in a variation in the electric resistance of the GMR sensor 10. When a predetermined voltage Vdd is applied to the GMR sensor 10, an output voltage (V1-V2) varies depending on the movement and the travel distance of the permanent magnet 8 in the X-axis direction, and an output voltage (V3-V4) varies depending on the movement and the travel distance of the permanent magnet 8 in the Y-axis direction. As a result, the relationship between the travel distance of the permanent magnet and the output voltage of the GMR sensor shown in FIGS. 11A and 11B is obtained. Therefore, it is possible to detect the position of the permanent magnet 8 on the basis of the output voltage that is approximate to a straight line surrounded by a dotted line in FIGS. 11A and 11B, and it is possible to detect the operating position of the operating lever 1 on the basis of a variation in the output voltage. In this way, it is possible to perform the switching of the operating lever 1.

In FIGS. 11A and 11B, a point 0 (zero) on the horizontal axis indicating the travel distance indicates a neutral position where the center O of the permanent magnet 8 is aligned with the center of the package of the GMR sensor 10 as shown in FIG. 9, for example, the position shown in FIG. 5B or FIG. 7B. Therefore, when the permanent magnet 8 is moved from the neutral position shown in FIG. 9 in the X-axis direction or the Y-axis direction, the output voltages (V1-V2 and V3-V4) of the GMR sensor 10 vary as shown in FIGS. 11A and 11B.

Next, the operation of the stalk switch device having the above-mentioned structure will be described with reference to FIGS. 5A to 8C.

FIG. 5B shows the state in which the operating lever 1 is not tilted with respect to the lever support 2. In this case, since the positional relationship between the permanent magnet 8 and the package of the GMR sensor 10 is as shown in FIG. 9, the output voltages (V1-V2) and (V3-V4) of the GMR sensor 10 become zero. In this state, when the operating lever 1 is tilted along the first operating surface, the operating lever 1 is rotated on the pin 13 with respect to the lever support 2, and the driving arm 5 is rotated on the shaft groove 2e of the lever support 2 in the first operating surface. Therefore, the slider 7 engaged with the engaging portion 5b of the driving arm 5 is moved along the guide wall 6a of the guide member 6, and the permanent magnet 8 is moved along one surface of the circuit board 9 without contacting the surface so as to become distant from the GMR sensor 10. Specifically, when the operating lever 1 is tilted in the direction of an arrow P1 in FIG. 5B, the driving arm 5 is rotated on the shaft portion 5a in the clockwise direction of FIG. 5A to slide the slider 7 in the left direction, as shown in FIG. 5A. Therefore, as shown in FIG. 6A, the permanent magnet 8 is moved to the left side of the GMR sensor 10. On the contrary, when the operating lever 1 is tilted in the direction of an arrow P2 in FIG. 5B, the driving arm 5 is rotated on the shaft portion 5a in the counterclockwise direction of FIG. 5B to slide the slider 7 in the right direction, as shown in FIG. 5C. Therefore, as shown in FIG. 6C, the permanent magnet is moved to the right side of the GMR sensor 10.

That is, when the operating lever 1 is tilted along the first operating surface in the direction of the arrow P1 or P2 in FIG. 5B, the permanent magnet 8 is reciprocated with respect to the GMR sensor 10 in the X-axis direction of FIG. 9. Therefore, the output voltage (V1-V2) of the GMR sensor 10 varies as shown in FIG. 11A. In this case, since the permanent magnet 8 is not moved with respect to the GMR sensor 10 in the Y-axis direction of FIG. 9, the output voltage (V3-V4) of the GMR sensor 10 is maintained at a zero level. Therefore, it is possible to detect the position of the permanent magnet 8 on the X-axis on the basis of the output voltage (V1-V2) of the GMR sensor 10. That it, it is possible to detect the position of the permanent magnet when the operating lever 1 is tilted in the direction of the arrow P1 or P2 in the first operating surface. It is possible to perform a beam switching operation of a headlamp or a switching operation for passing on the basis of the detection results. When the operating lever 1 is in the state shown in FIG. 5B, the headlamp is at a low beam position. When the operating lever 1 is in the state shown in FIG. 5C, the headlamp is at a high beam position. At the low beam position and the high beam position, the first pressing member 14 is fitted into a valley portion of the cam surface 2b of the lever support 2. Therefore, the operating lever 1 is maintained at the low beam position or the high beam position. In addition, it is possible to perform a passing operation by tilting the operating lever 1 from the low beam position to the state shown in FIG. 5A. During the passing operation, the first pressing member 14 is placed on a mountain portion of the cam surface 2b while compressing the coil spring 15. When the operating force is removed, the operating lever 1 automatically returns to the low beam position by the elastic force of the coil spring 15.

FIG. 7B shows the state in which the operating lever 1 and the lever support 2 are not tilted with respect to the housing 12. In this case, since the positional relationship between the permanent magnet 8 and the package of the GMR sensor 10 is as shown in FIG. 9, the output voltages (V1-V2) and (V3-V4) of the GMR sensor 10 become zero. In this state, when the operating lever 1 is tilted along the second operating surface, the operating lever 1 and the lever support 2 are integrally rotated on the rotating shafts 2c and 2d with respect to the housing 12, and the driving arm 5, the guide member 6, and the slider 7 are rotated on the rotating shafts 2c and 2d in the second operating surface. Therefore, the permanent magnet 8 is moved along one surface of the circuit board 9 without contacting the surface so as to become distant from the GMR sensor 10. Specifically, when the operating lever 1 is tilted in the direction of an arrow Q1 in FIG. 7B, the driving arm 5 is rotated on the rotating shafts 2c and 2d in the counterclockwise direction of FIG. 7A to incline the engaging portion 5b upward, as shown in FIG. 7A. Therefore, as shown in FIG. 8A, the permanent magnet 8 is obliquely moved to the upper side of the GMR sensor 10. On the contrary, when the operating lever 1 is tilted in the direction of an arrow Q2 of FIG. 7B, the driving arm 5 is rotated on the rotating shafts 2c and 2d in the clockwise direction of FIG. 7C to incline the engaging portion 5b downward, as shown in FIG. 7C. Therefore, as shown in FIG. 8C, the permanent magnet 8 is obliquely moved to the lower side of the GMR sensor 10.

That is, when the operating lever 1 is tilted along the second operating surface in the direction of the arrow Q1 or Q2 of FIG. 7B, the permanent magnet 8 is reciprocated with respect to the GMR sensor 10 in an arc shape along the Y-axis direction of FIG. 9. Therefore, the output voltage (V3-V4) of the GMR sensor 10 varies as shown in FIG. 11B. In this case, since the permanent magnet 8 is hardly displaced with respect to the GMR sensor 10 in the X-axis direction of FIG. 9, the output voltage (V1-V2) of the GMR sensor 10 is approximately zero. Therefore, it is possible to detect the position of the permanent magnet 8 on the Y-axis on the basis of the output voltage (V3-V4) of the GMR sensor 10. That it, it is possible to detect the position of the permanent magnet when the operating lever 1 is tilted in the direction of the arrow Q1 or Q2 in the second operating surface. It is possible to perform a switching operation for a left or right turn signal on the basis of the detection results.

As described above, in the stalk switch device, which is an example of the lever operating device according to this embodiment, when the operating lever 1 is tilted in one of the first and second operating surfaces that are substantially orthogonal to each other, the slider 7 supported by the lever support 2 is moved in one of the two directions (the X-axis and Y-axis directions in FIG. 9) that are substantially orthogonal to each other in the plane parallel to the circuit board 9, and an external magnetic field varies depending on the position of the permanent magnet 8 held by the slider 7. With the variation in the magnetic field, the electric resistance of the GMR sensor 10 mounted to the circuit board 9 varies. Therefore, it is possible to detect the operating position of the operating lever 1 on the basis of the variation in the resistance of the GMR sensor 10. As a result, it is possible to prevent contact defects, such as the abrasion or the oxidation of contact points, and lengthen the life span of a switch device. In addition, it is possible to detect the tilting operation of the operating lever 1 in the first operating surface and the tilting operation of the operating lever 1 in the second operating surface using a set of the permanent magnet 8 and the GMR sensor 10. As a result, it is possible to simplify a detection mechanism and reduce the size of a switch device.

In the stalk switch device according to this embodiment, the shaft portion 5a of the driving arm 5 is rotatably supported by the lever support 2, and the engaging portion 5b and the engaging pin 5c of the driving arm 5 are engaged with the slider 7 and a base portion of the operating lever 1, respectively, such that the tilting force of the operating lever 1 in the first operating surface is converted into the movement of the slider 7 in one direction through the rotation of the driving arm 5. Therefore, when the operating lever 1 is tilted, it is possible to smoothly move the slider 7 in a desired direction. In addition, it is possible to increase the movement of the slider 7 in the first operating surface, and increase a variation in the output of the GMR sensor 10. As a result, it is possible to easily set a signal switching threshold value for a switching operation, and increase the number of switching stages.

Although the stalk switch device for a turn signal has been described in the above-described embodiment, the invention is not limited thereto. The invention can be applied to, for example, a stalk switch device for a wiper.

What is claimed is:

1. A lever operating device comprising:
    an operating lever;
    a lever support that supports the operating lever such that the operating lever can be tilted in a first operating surface;
    a housing that supports the operating lever through the lever support such that the operating lever can be rotated in a second operating surface substantially orthogonal to the first operating surface;
    a circuit board that is attached to the housing and extends substantially in parallel to the second operating surface;
    a giant magneto-resistive effect sensor that is mounted to the circuit board;
    a slider that is movably supported by the lever support; and
    a permanent magnet that is held by the slider and is magnetized in a direction that is substantially orthogonal to the circuit board,
    wherein when the operating lever is tilted in the first operating surface, the slider is moved in one direction in a plane that is parallel to the circuit board,
    wherein when the operating lever is tilted in the second operating surface, the lever support and the slider are moved in the other direction in the plane that is parallel to the circuit board,
    wherein the giant magneto-resistive effect sensor detects a variation in the magnetic field of the permanent magnet due to the movement of the slider, and
    wherein a driving member is rotatably supported by the lever support, the driving member is engaged with the operating lever and the slider, and the tilting force of the operating lever in the first operating surface is converted into the movement of the slider in one direction through the rotation of the driving member.

* * * * *